US006617958B1

(12) United States Patent  
Hwan

(10) Patent No.: US 6,617,958 B1  
(45) Date of Patent: Sep. 9, 2003

(54) OPTICAL POTENTIOMETER

(75) Inventor: Yi-Ting Hwan, Taoyuan (TW)

(73) Assignee: Taiwan Alpha Electronic Co., Ltd., Taoyuan (TW)

( * ) Notice: Subject to any disclaimer, the term of this patent is extended or adjusted under 35 U.S.C. 154(b) by 0 days.

(21) Appl. No.: 10/131,159

(22) Filed: Apr. 24, 2002

(51) Int. Cl.$^7$ ............................................... H01C 10/00
(52) U.S. Cl. ..................... 338/196; 338/15; 338/199; 250/214 PR; 359/223
(58) Field of Search ................... 338/15, 68, 196, 338/199; 250/214 PR; 359/223

(56) References Cited

U.S. PATENT DOCUMENTS

| | | | | |
|---|---|---|---|---|
| 3,859,617 A | * | 1/1975 | Oka et al. ..................... 338/15 |
| 4,523,090 A | * | 6/1985 | Wagner ................. 250/214 PR |
| 4,796,000 A | * | 1/1989 | Mondl .......................... 338/15 |
| 5,343,186 A | * | 8/1994 | Zampini et al. ............. 338/15 |
| 5,719,570 A | * | 2/1998 | Breitbarth .................... 341/13 |
| 5,907,114 A | * | 5/1999 | Culver ......................... 84/313 |
| 6,025,588 A | * | 2/2000 | Hsu ....................... 250/214 PR |

\* cited by examiner

Primary Examiner—Karl D. Easthom  
(74) Attorney, Agent, or Firm—Thomas R. Vigil; Welsh & Katz, Ltd.

(57) ABSTRACT

An optical potentiometer comprised of a specialized circuit board and a movable reflector device capable of traveling left and right stably on the specialized circuit board. The movable reflector device has a reflecting mirror suitably disposed in alignment with a light wave transmitter on the specialized circuit board that enables the reflection of light waves emitted by the light wave transmitter to the area of a point detecting light wave receiver. The light waves are thereafter amplified and filtered to predetermined settings by an amplifier and a filter on the specialized circuit board and, furthermore, stored in an memory bank as reference values that facilitate a controller to calculate the actual distance traveled by the movable reflector device through a comparison of the predetermined settings with the standard excursion range in the controller, which then drives an digital variable resistor to output a resistance value that corresponds to the distance traveled.

3 Claims, 7 Drawing Sheets

OPTICAL POTENTIOMETER

BACKGROUND OF THE INVENTION

The invention herein relates to an optical potentiometer, specifically an optical potentiometer of an original arrangement in which the actual distance traveled by the movable reflector device of the said optical potentiometer is measured by an optically controlled method, with the results then driving a digital variable resistor to output a corresponding electrical resistance value.

Conventional variable resistors or potentiometers typically consists of a sliding or rotating member tipped with a wiper that is in contact with a resistive carbon element to output a certain value of electrical resistance. Although such conventional variable resistors or potentiometers are used in large volume by industry and, furthermore, have been utilized for quite some time, since frictional union must be maintained between the wiper of the sliding or rotating member and the resistive carbon element, this not only adversely affects the service life of the said variable resistors or potentiometers, but also renders them incapable accurate resistance values and, furthermore, generates considerable noise in electronic equipment. Therefore, as quality and precision requirements in the electronics technology industry become more stringent, solving the said problems have gradually become an important concern among electronics manufacturers.

In view of the said situation, the inventor of the invention herein conducted extensive studies regarding improvements based on many years of experience gained while engaged in the research and development of variable resistors and potentiometers which culminated in the successful innovation of the optical potentiometer of the present invention.

SUMMARY OF THE INVENTION

The primary objective of the invention herein is to provide an optical potentiometer in which a movable reflector device capable of stable travel to the left and right redirects light waves emitted by a light wave transmitter to the area of a point detecting light wave receiver at the side, following which a comparison against predetermined settings of standard excursion range is executed to measure the actual distance traveled by the movable reflector device, with the results then driving a digital variable resistor to output the corresponding, accurate resistance value.

Another objective of the invention herein is to provide an optical potentiometer in which operation is based on optical principles to eliminate the utilization of friction between a wiper and a resistive carbon element to thereby reduce electronic device noise and increase potentiometer service life.

To enable a further understanding of the structural features of the invention herein, the brief description of the drawings below is followed by the detailed description of the present invention.

DETAILED DESCRIPTION OF THE INVENTION

Figure 1A:
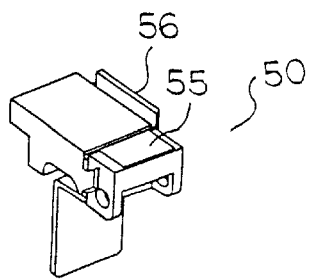
FIG. 1A is an isometric drawing of the movable reflector device.
Figure 1:
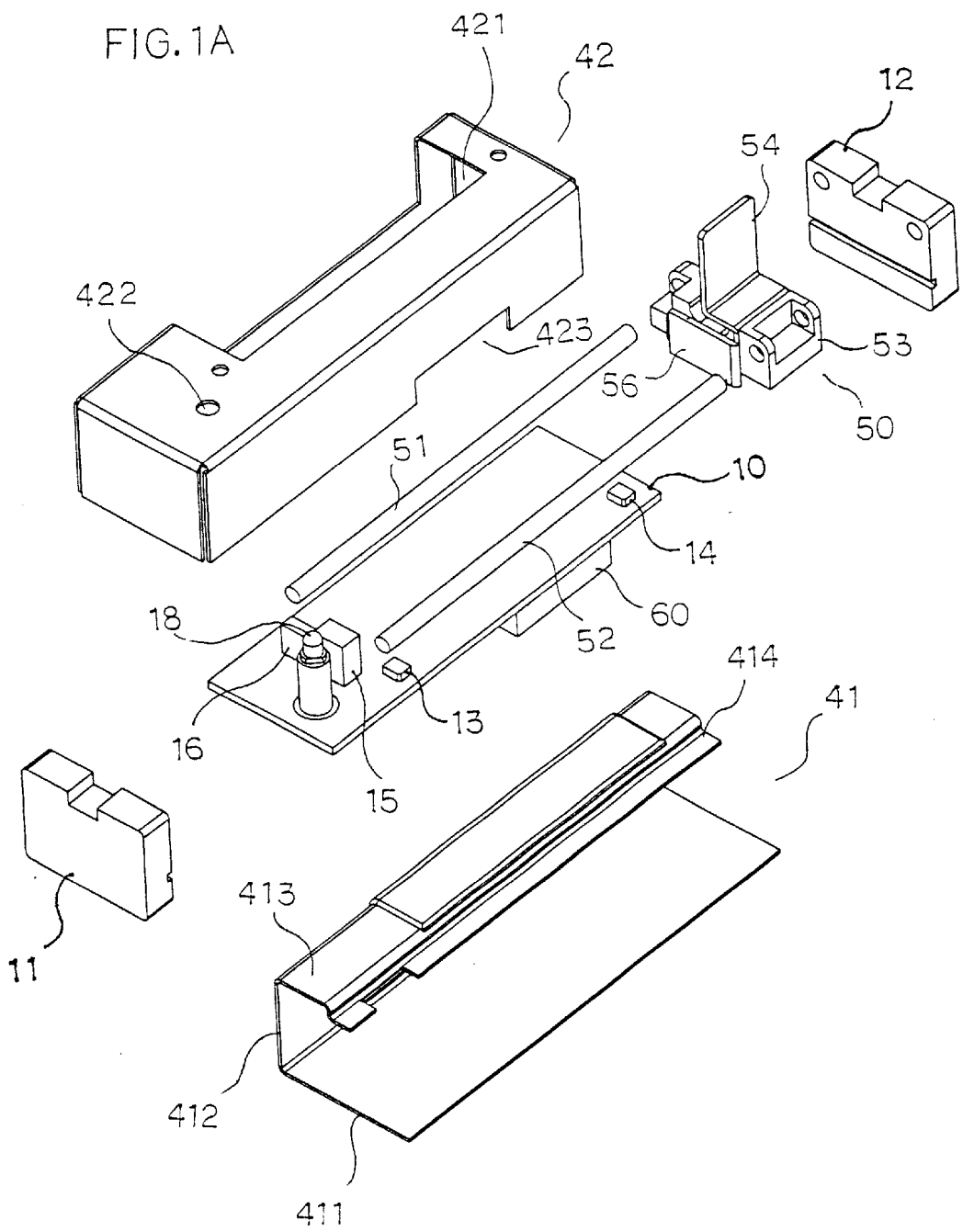
FIG. 1 is an exploded drawing of the disclosed optical potentiometer of the invention herein.
Figure 2:
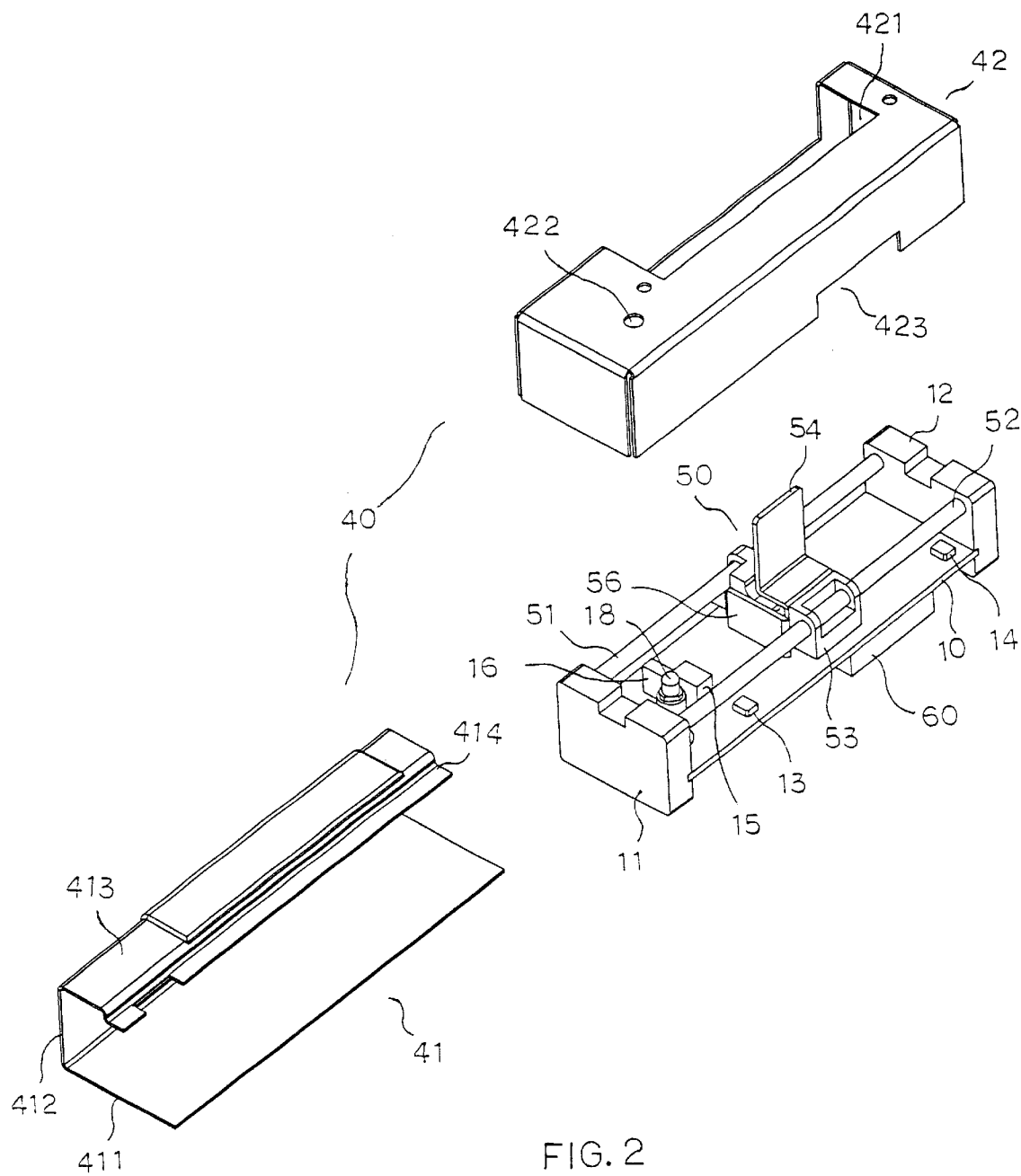
FIG. 2 is an isometric drawing of the disclosed optical potentiometer of the invention herein before installation into the case.

Referring to FIG. 1, FIG. 1A, FIG. 2, FIG. 3, and FIG. 4, the disclosed optical potentiometer of the invention herein is comprised of a specialized circuit board 10 and a movable reflector device 50 capable of traveling left and right stably on the said specialized circuit board 10, wherein in addition to a respectively emplaced left side block 11 and a right side block 12, the said specialized circuit board 10 has a left boundary light sensor 13 and a right boundary light sensor 14 appropriately situated at its left and right extremities, a light wave transmitter 15 that is disposed at the outer side of the said left boundary light sensor 13 and oriented to transmit light waves towards the said right light sensor 14 and, furthermore, a point detecting light wave receiver 16 positioned at the side of the said light wave transmitter 15, the said light wave transmitter 15 consisting of an IR transmission driver 17 for driving operations; and a malfunction indicator light 18 at the outer side of the said light wave transmitter 15.

Figure 7:
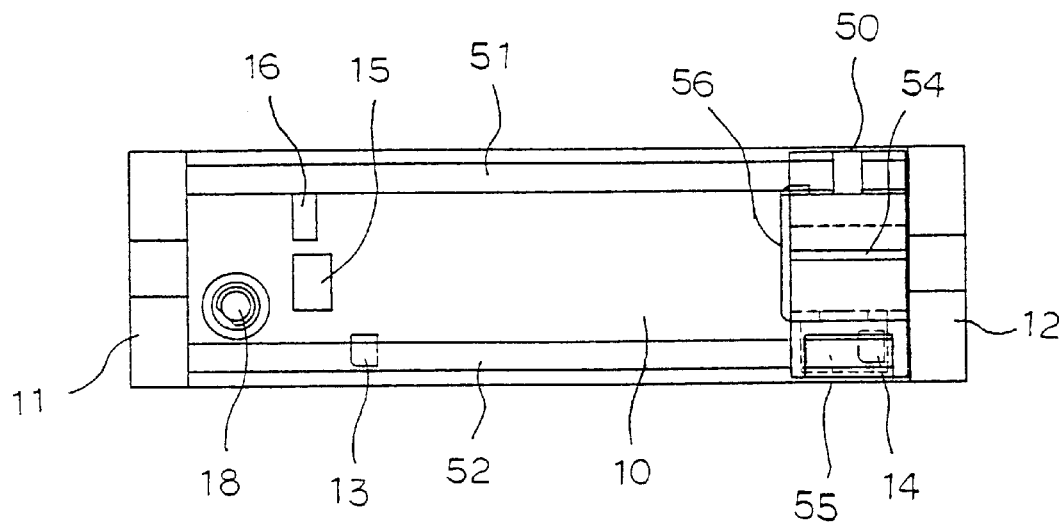
FIG. 7 is an orthographic drawing of the disclosed optical potentiometer of the invention herein that illustrates the second phase of operation.

The said movable reflector device 50 consists of a slide block 53 that travels horizontally leftward and rightward in a level disposition on two parallel transverse rods 51 and 52 between the said left side block 11 and right side block 12; in addition to an L-shaped push-pull actuating tab 54 at its upper aspect, the said slide block 53 has a light wave reflector plate 55 appropriately disposed on its bottom section so that the said plate is situated above the said left boundary light sensor 13 and right boundary light sensor 14, as indicated in FIG. 1A, such that when the said movable reflector device 50 transits to the said left boundary light sensor 13 or right boundary light sensor 14 (as shown in FIG. 7), minimum or maximum increments of distance traveled by the said movable reflector device 50 are ascertained through the reflected light wave reception capability of the said left boundary light sensor 13 or right boundary light sensor 14. In other words, when the light wave reflector plate 55 transits over the said left boundary light sensor 13, the said left boundary light sensor 13 reckons the minimum increments of displacement occurring in the said movable reflector device 50 through its reflected light wave reception capability; conversely, when the light wave reflector plate 55 transits over the said right boundary light sensor 14, the said right boundary light sensor 14 reckons the maximum increments of displacement occurring in the said movable reflector device 50 through its reflected light wave reception capability.

Figure 6:
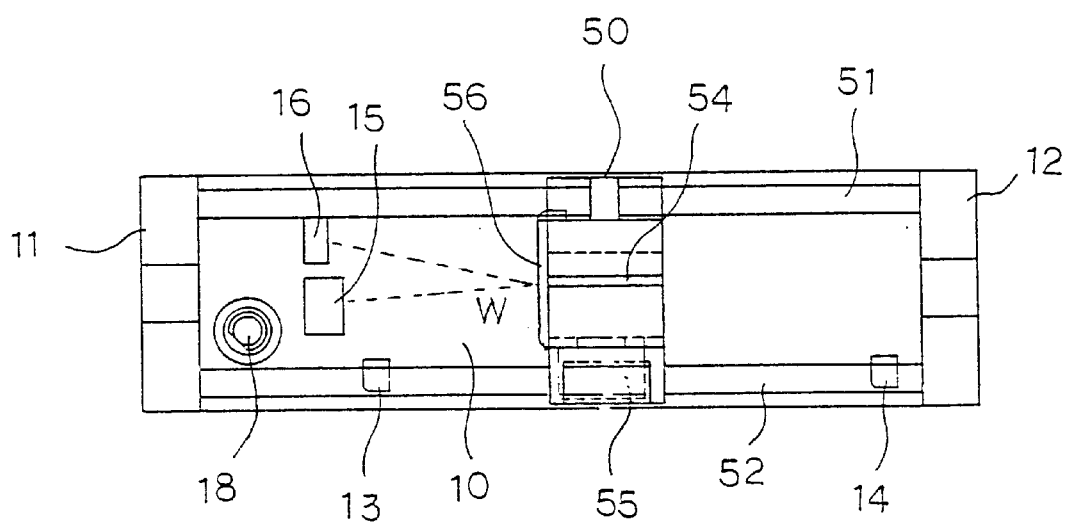
FIG. 6 is an orthographic drawing of the disclosed optical potentiometer of the invention herein that illustrates the first phase of operation.
Figure 8:
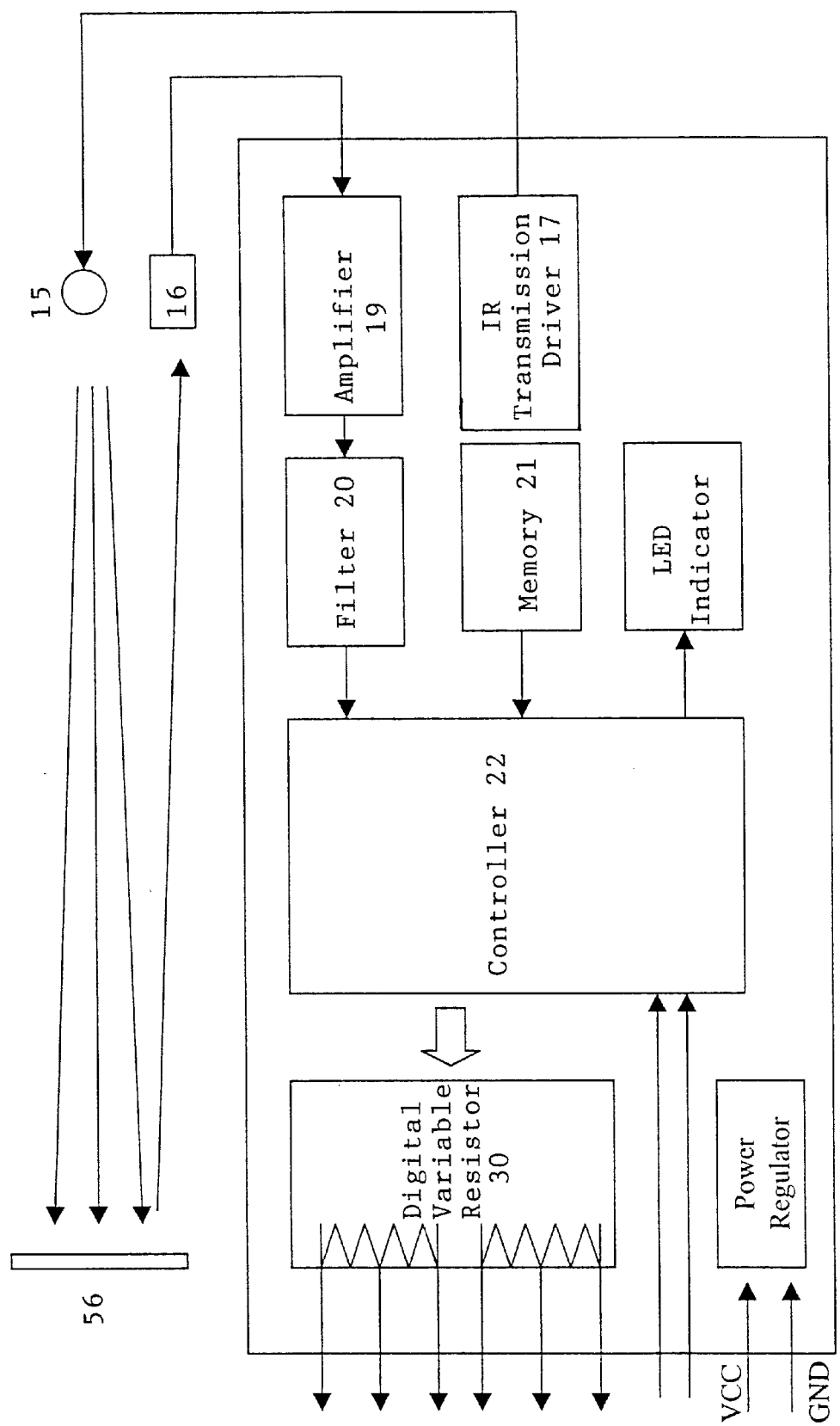
FIG. 8 is circuit diagram of the disclosed optical potentiometer of the invention herein.

The said movable reflector device 50 also has a reflecting mirror 56 disposed on the side facing the said light wave transmitter 15 that enables the redirection of light waves w emitted by the said light wave transmitter 15 to the said point detecting light wave receiver 16 area, as indicated in FIG. 6. Therefore, when light waves w are received at the said point detecting light wave receiver 16 area, they are amplified and filtered to predetermined settings by an additionally disposed amplifier 19 and a filter 20 appropriately situated on the said specialized circuit board 10 and, furthermore, stored in an additionally disposed memory 21 bank as reference values that facilitate an additionally disposed controller 22 to calculate the actual distance traveled by the said movable reflector device 50 by comparing the predetermined settings with the standard excursion range in the said controller 22, which then drives an additionally disposed digital variable resistor 30 to output a resistance value that corresponds to the said distance traveled. The said operation process is illustrated in the circuit diagram of the invention herein shown in FIG. 8.

Figure 3:
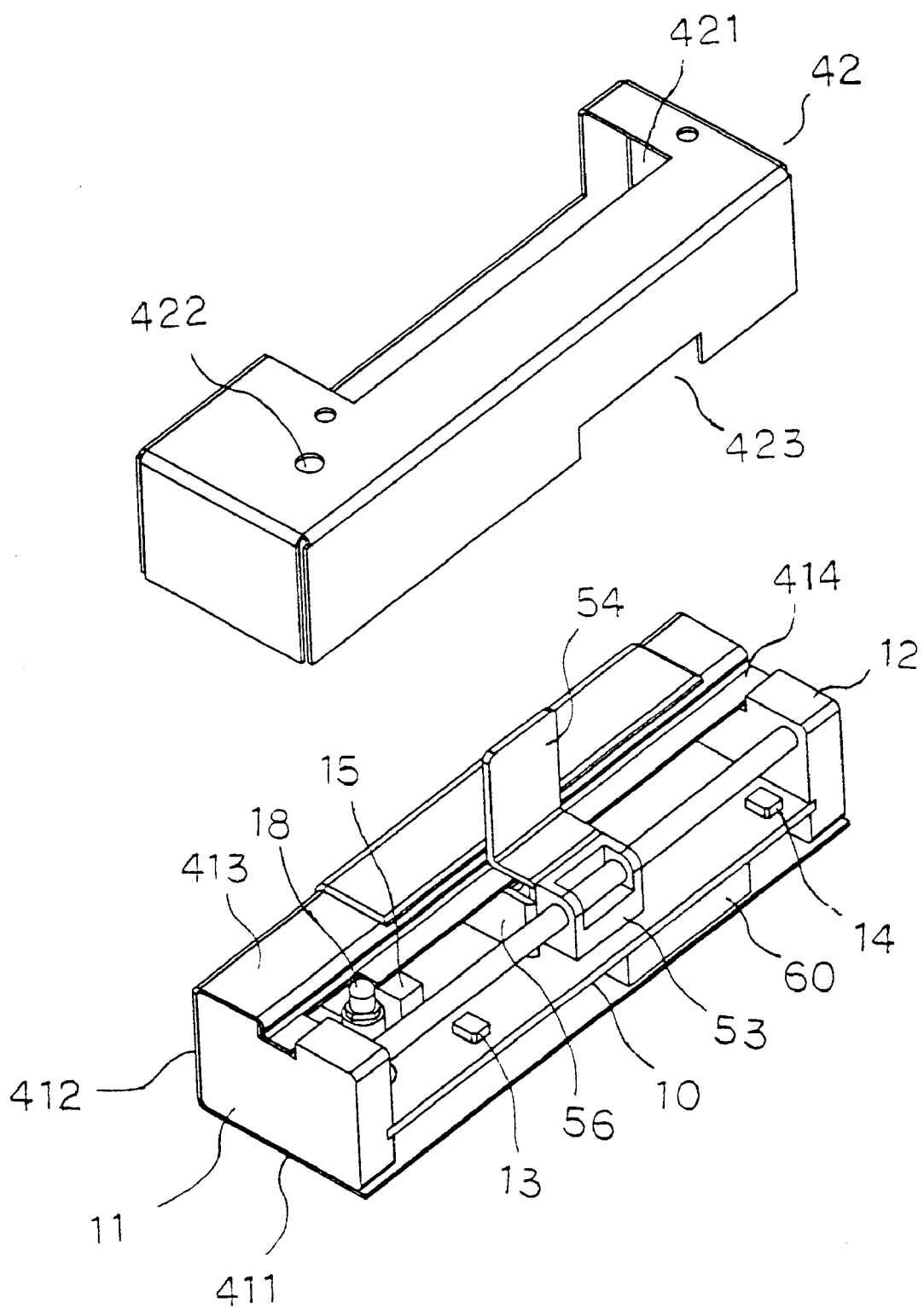
FIG. 3 is an isometric drawing of the disclosed optical potentiometer of the invention herein during installation into the case.
Figure 4:
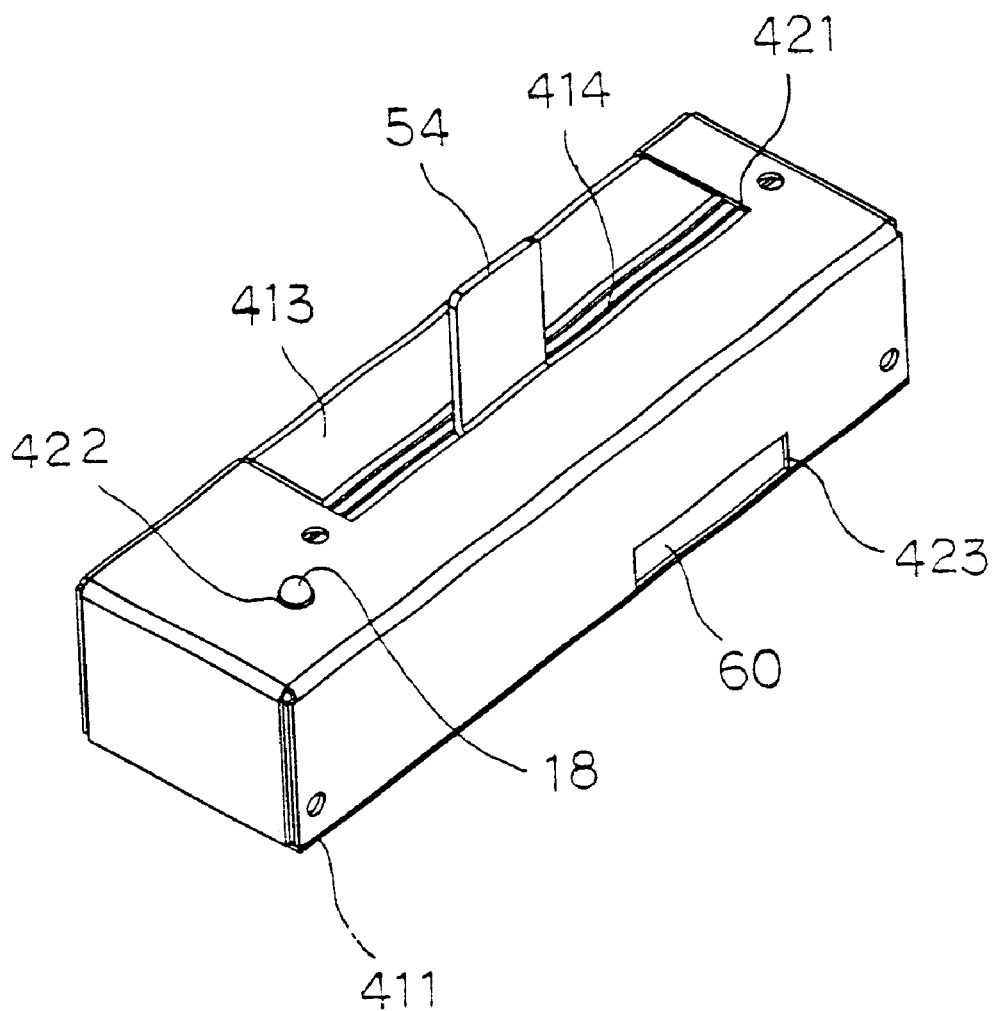
FIG. 4 is an isometric drawing of the disclosed optical potentiometer of the invention herein after installation into the case.

Referring again to FIG. 2, FIG. 3, and FIG. 4, the invention herein is also comprised of a lower base 41 and an upper cover 42 that constitute a case 40, wherein in addition to a bottom surface 411, the said lower base 41 has a vertical lateral surface 412 formed by a perpendicular bend upward along its left edge and, furthermore, a semi-lateral top surface 413 formed by a perpendicular bend towards the right such that it is parallel to the said bottom surface 412, enabling the said lower base 41 to be slipped lengthwise onto exterior sides of the said assembled optical potentiometer, as indicated in FIG. 3. Referring to FIG. 3, a step-shaped construct 414 is crimped downward along the outer edge of the said semi-lateral top surface 413, enabling the insertion of the said step-shaped construct 414 under the said L-shaped push-pull actuating tab 54.

Figure 5:
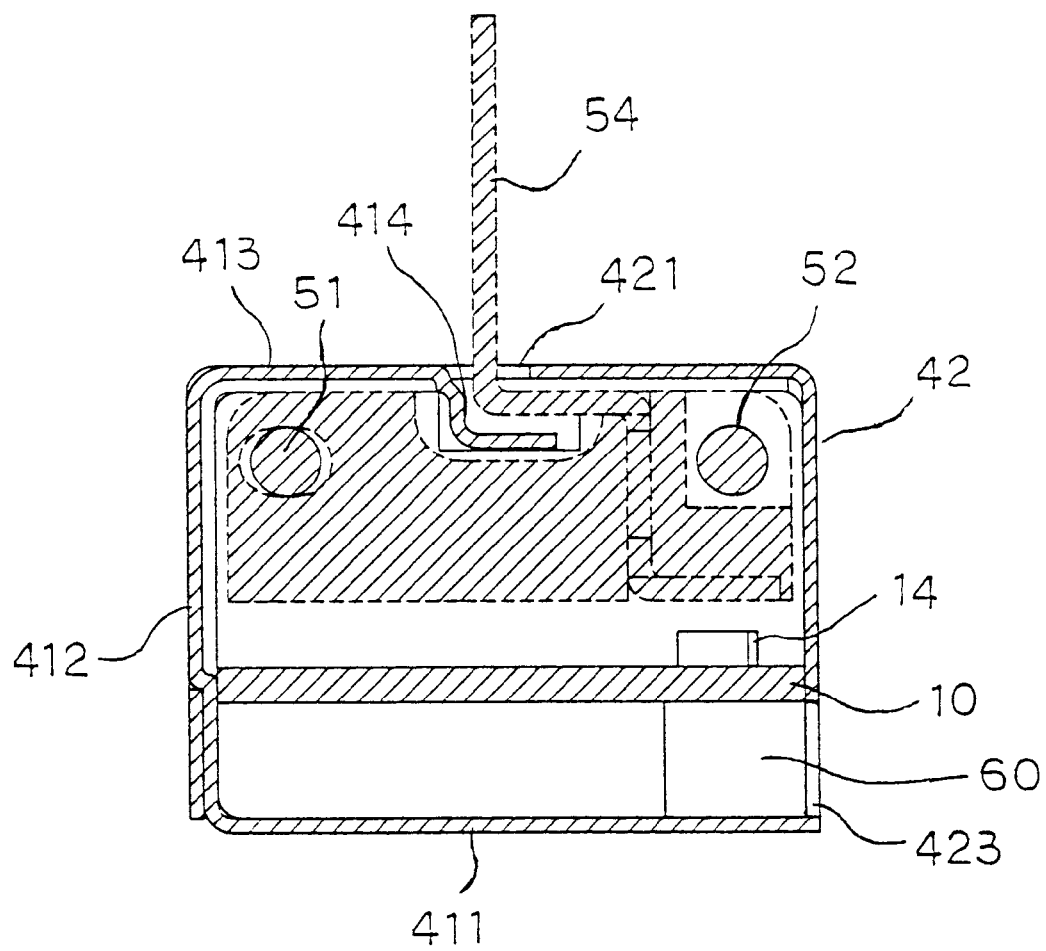
FIG. 5 is a cross-sectional drawing of the disclosed optical potentiometer of the invention herein.

After the said lower base 41 slipped onto the said assembled optical potentiometer, the said upper cover 42 is fitted over the exterior; an open slot 421 is additionally formed in the said upper cover 42 that provides for the movement of the said push-pull actuating tab 54 and, since the edges of the said open slot 421 are situated immediately above the said step-shaped construct 414, as indicated in FIG. 5, the invention herein effectively prevents the direct penetration of light rays from the outside into the interior, thereby effectively ensuring the normal operation of the said optical potentiometer. Furthermore, a hole 422 is formed at an appropriate position in the said upper cover 42 to enable the outward protrusion of the said malfunction indicator light 18, which thereby provides for the abnormal operation warning feature of the said optical potentiometer.

Based on the said description, when the said movable reflector device 50 is displaced to the maximum extent of travel, the said optical potentiometer outputs the maximum electrical resistance value relative to the rated capacity of the said potentiometer, conversely, when the said movable reflector device 50 is displaced to the minimum extent of travel, the said optical potentiometer outputs the minimum electrical resistance value relative to the rated capacity of the said potentiometer.

Furthermore, an output socket 60 is disposed at a suitable position under the said specialized circuit board 10; in addition to being aligned with an opening 423 formed in the said upper cover 42, the said output socket 60 provides for the docking of an external plug (not shown in the drawings) to enable the external output operation of the said optical potentiometer, thereby providing for the setting of the said optical potentiometer.

In summation of the foregoing section, since the disclosed optical potentiometer of the invention herein is capable of outputting specific electrical resistance values based on optical principles and, in addition to the ensured output of electrical resistance values at an absolute degree of accuracy, the present invention does not involve friction between a wiper and a carbon resistive element to achieve corresponding resistance values and thereby effectively reduces potentiometer noise readings, while also significantly increasing potentiometer service life, therefore, the disclosed optical potentiometer of the invention herein fully complies with the needs of industrial utility value; additionally, as a survey of the current market has not revealed an identical or similar technological device and, furthermore, the invention herein is of an extremely simple structural arrangement, therefore, the present invention meets patent application requirements and is submitted to the examination committee for review and the granting of the commensurate patents.

What is claimed is:

1. An optical potentiometer comprising:

a specialized circuit board being emplaced between a left side block and a right side block, said specialized circuit board having a left boundary light sensor and a right boundary light sensor at its left and right extremities, the outer side of said left boundary light sensor being provided with a light wave transmitter being capable of transmitting light waves towards the said right light sensor, furthermore, a point detecting light wave receiver being positioned at the side of said light wave transmitter, said light wave transmitter being consisted of an IR transmission driver for driving operations, and a suitable position under said specialized circuit board being provided with an output socket for providing for the electrical resistance output of said optical potentiometer or other required calibration and input data;

a movable reflector device being consisted of a slide block being capable of traveling horizontally leftward and rightward in a level disposition on two parallel transverse rods between said left side block and said right side block; said slide block being provided with an L-shaped push-pull actuating tab at its upper aspect, a light wave reflector plate being capable of situating above said left boundary light sensor and said right boundary light sensor appropriately disposed on the bottom section of said slide block such that minimum or maximum increments of distance traveled by said movable reflector device are ascertained through the reflected light wave reception capability of the said left boundary light sensor or the said right boundary light sensor when said movable reflector device transits to said left boundary light sensor or said right boundary light sensor, furthermore, the side facing said light wave transmitter of said movable reflector device being provided with a reflecting mirror for reflecting light waves emitted by said light wave transmitter to the area of said point detecting light wave receiver; and a case being consisted of a lower base and an upper cover, said lower base being provided with a bottom surface, said bottom surface having a vertical lateral surface formed by a perpendicular bend upward along its left edge, and a semi-lateral top surface formed by a perpendicular bend towards the right such that it is parallel to said bottom surface, enabling said lower base to be slipped lengthwise onto exterior sides of said assembled optical potentiometer, furthermore, a step-shaped construct being crimped downward along the outer edge of said semi-lateral top surface, enabling the insertion of said step-shaped construct under said L-shaped push-pull actuating tab; said upper cover being then fitted onto said lower base ensconcing said optical potentiometer; and said upper cover having an open slot for providing for the movement of said push-pull actuating tab such that, when light waves are received at said point detecting light wave receiver area, they are amplified and filtered to predetermined settings by an additionally disposed amplifier and a filter appropriately situated on said specialized circuit board and, furthermore, stored in an additionally disposed memory bank as reference values that facilitate an additionally disposed controller to calculate the actual distance traveled by the said movable reflector device by comparing the predetermined settings with the standard excursion range in the said controller, which then drives an additionally disposed digital variable resistor to output a resistance value that corresponds to the said distance traveled.

2. The optical potentiometer of claim 1, wherein said optical potentiometer will output the maximum electrical resistance value relative to the rated capacity of said potentiometer when said movable reflector device is displaced to the maximum extent of travel; conversely, said optical potentiometer will output the minimum electrical resistance value relative to the rated capacity of said potentiometer when said movable reflector device is displaced to the minimum extent of travel.

3. The optical potentiometer of claim 1, wherein said specialized circuit board can be additionally equipped with a malfunction indicator light projecting from said case that alerts the user when said optical potentiometer is incapable of normal operation.

* * * * *